US012766709B2

(12) United States Patent
Hatada et al.

(10) Patent No.: US 12,766,709 B2
(45) Date of Patent: Oct. 20, 2026

(54) CONTROL DEVICE, MECHANICAL SYSTEM, METHOD, AND COMPUTER PROGRAM FOR PERFORMING PREDETERMINED WORK BY MOVING PLURALITY OF MOVING MACHINES

(71) Applicant: Fanuc Corporation, Minamitsuru-gun (JP)

(72) Inventors: Masanobu Hatada, Minamitsuru-gun (JP); Yuuki Machida, Minamitsuru-gun (JP)

(73) Assignee: FANUC CORPORATION, Yamanashi (JP)

(*) Notice: Subject to any disclaimer, the term of this patent is extended or adjusted under 35 U.S.C. 154(b) by 212 days.

(21) Appl. No.: 18/265,006

(22) PCT Filed: Dec. 10, 2021

(86) PCT No.: PCT/JP2021/045677
§ 371 (c)(1),
(2) Date: Jun. 2, 2023

(87) PCT Pub. No.: WO2022/131175
PCT Pub. Date: Jun. 23, 2022

(65) Prior Publication Data
US 2024/0001545 A1 Jan. 4, 2024

(30) Foreign Application Priority Data
Dec. 17, 2020 (JP) ................................ 2020-209530

(51) Int. Cl.
*B25J 9/16* (2006.01)

(52) U.S. Cl.
CPC ............ *B25J 9/163* (2013.01); *B25J 9/1602* (2013.01); *B25J 9/1653* (2013.01); *B25J 9/1664* (2013.01)

(58) Field of Classification Search
CPC ........ B25J 9/163; B25J 9/1602; B25J 9/1653; B25J 9/1664
(Continued)

(56) References Cited

U.S. PATENT DOCUMENTS 4,590,577 A * 5/1986 Nio ........................ G05B 19/42 901/3
5,327,058 A * 7/1994 Rembutsu ............ G05B 19/425 318/568.11
(Continued)

FOREIGN PATENT DOCUMENTS

JP 63235073 A 9/1988
JP 05318347 A 12/1993
(Continued)

OTHER PUBLICATIONS

International Search Report and Written Opinion for International Application No. PCT/JP2021/045677, dated Mar. 8, 2022, 6 pages.

*Primary Examiner* — Wade Miles
*Assistant Examiner* — Sidney Leigh Molnar
(74) *Attorney, Agent, or Firm* — BUCHANAN INGERSOLL & ROONEY PC

(57) ABSTRACT

A control device includes a moving machine operation unit for moving an end effector by operating a plurality of moving machines; an operating state data acquisition unit for acquiring operating state data indicating the operating states of the moving machines; an adaptive control execution unit for adjusting an output value of the end effector, in accordance with the operating state data acquired by the operating state data acquisition unit; and an input switching unit for switching the moving machines from which the operating state data acquisition unit acquires the operating state data, from a first moving machine to a second moving machine, in accordance with a predetermined command.

8 Claims, 7 Drawing Sheets

(58) Field of Classification Search
USPC ................. 700/245–264; 318/568.11–568.25
See application file for complete search history.

(56) References Cited

U.S. PATENT DOCUMENTS 5,549,018 A 8/1996 Nihei et al.
5,572,103 A * 11/1996 Terada ................... B25J 9/1656 901/3
5,675,229 A * 10/1997 Thorne .................. B25J 9/1671 318/568.25
6,064,168 A * 5/2000 Tao ........................ B25J 9/1607 318/568.22
6,133,545 A * 10/2000 Okazaki ............... B23K 9/0953 219/130.01
6,340,875 B1 1/2002 Watanabe et al.
6,836,702 B1 * 12/2004 Brogårdh ........... B23K 26/0884 700/262
7,209,802 B2 * 4/2007 Jerregard ............... B25J 9/1656 219/121.72
7,734,358 B2 * 6/2010 Watanabe ............ G05B 19/425 318/568.25
2008/0035619 A1 * 2/2008 Hamaguchi ............ B25J 9/1664 219/121.79
2011/0120978 A1 * 5/2011 Takahashi ............ B23K 11/253 219/86.25
2014/0297033 A1 10/2014 Tao et al.
2016/0288322 A1 * 10/2016 Lin .......................... B25J 9/163
2017/0083002 A1 * 3/2017 Hatada ................. B23K 11/253
2017/0090431 A1 * 3/2017 Komatsu .............. B23K 9/1274
2017/0371326 A1 * 12/2017 Okazaki ................... B23K 9/12
2018/0164793 A1 * 6/2018 Takahashi ............ B23K 26/032
2019/0009360 A1 * 1/2019 Aoki .................... B23K 26/046
2019/0291273 A1 * 9/2019 Inoue ..................... B23K 26/38
2020/0282553 A1 * 9/2020 Simkins ................. B25J 9/1602
2020/0368904 A1 11/2020 Aldridge et al.
2021/0046643 A1 * 2/2021 Kegasa .................. B25J 9/1666
2021/0178592 A1 * 6/2021 Nishimura ........... B23K 26/082

FOREIGN PATENT DOCUMENTS

JP 2000271888 A 10/2000
JP 2014198373 A 10/2014
JP 2020104178 A 7/2020

* cited by examiner

CONTROL DEVICE, MECHANICAL SYSTEM, METHOD, AND COMPUTER PROGRAM FOR PERFORMING PREDETERMINED WORK BY MOVING PLURALITY OF MOVING MACHINES

CROSS REFERENCE TO RELATED APPLICATIONS

This is the U.S. National Phase application of PCT/JP2021/045677, filed Dec. 10, 2021, which claims priority to Japanese Patent Application No. 2020-209530, filed Dec. 17, 2020, the disclosures of each of these applications being incorporated herein by reference in their entireties for all purposes.

FIELD OF THE INVENTION

The present disclosure relates to a control device, a machine system, a method, and a computer program for moving a plurality of movement machines to perform predetermined work.

BACKGROUND OF THE INVENTION

A system is known that can perform adaptive control for adjusting an output value of an end effector in response to operation state data of a movement machine (e.g., a vertical articulated type robot) (e.g., Patent Document 1).

PATENT LITERATURE

Patent Document 1: JP 2014-198373 A

SUMMARY OF THE INVENTION

In the related art, in a case where an end effector is moved by a plurality of movement machines, there is a need for a technique that enables the performance of adaptive control by dynamically switching to a movement machine from which operation state data is to be acquired.

According to an aspect of the present disclosure, a control device that moves an end effector by a plurality of movement machines and perform predetermined work on a workpiece with the end effector includes a movement machine operation section that moves the end effector by operating the plurality of movement machines, an operation state data acquisition section that acquires operation state data indicating an operation state of the movement machine operated by the movement machine operation section, an adaptive control execution section that adjusts an output value of the end effector for the predetermined work in response to the operation state data acquired by the operation state data acquisition section, and an input switching section that switches the movement machine, the operation state data of which is to be acquired by the operation state data acquisition section, from a first movement machine of the plurality of movement machines to a second movement machine of the plurality of movement machines, in response to a predetermined command.

According to another aspect of the present disclosure, a method of moving an end effector by a plurality of movement machines and performing predetermined work on a workpiece by the end effector includes moving, by a processor, the end effector by operating the plurality of movement machines, acquiring, by the processor, operation state data indicating an operation state of the movement machine, adjusting, by the processor, an output value of the end effector for the predetermined work in response to the operation state data acquired, and switching, by the processor, the movement machine, the operation state data of which is to be acquired, from a first movement machine of the plurality of movement machines to a second movement machine of the plurality of movement machines, in response to a predetermined command.

According to the present disclosure, the processor can dynamically switch between the plurality of movement machines to a movement machine, the operation state data of which is to be acquired, in response to a predetermined command.

DETAILED DESCRIPTION OF EMBODIMENTS OF THE INVENTION

Figure 1:
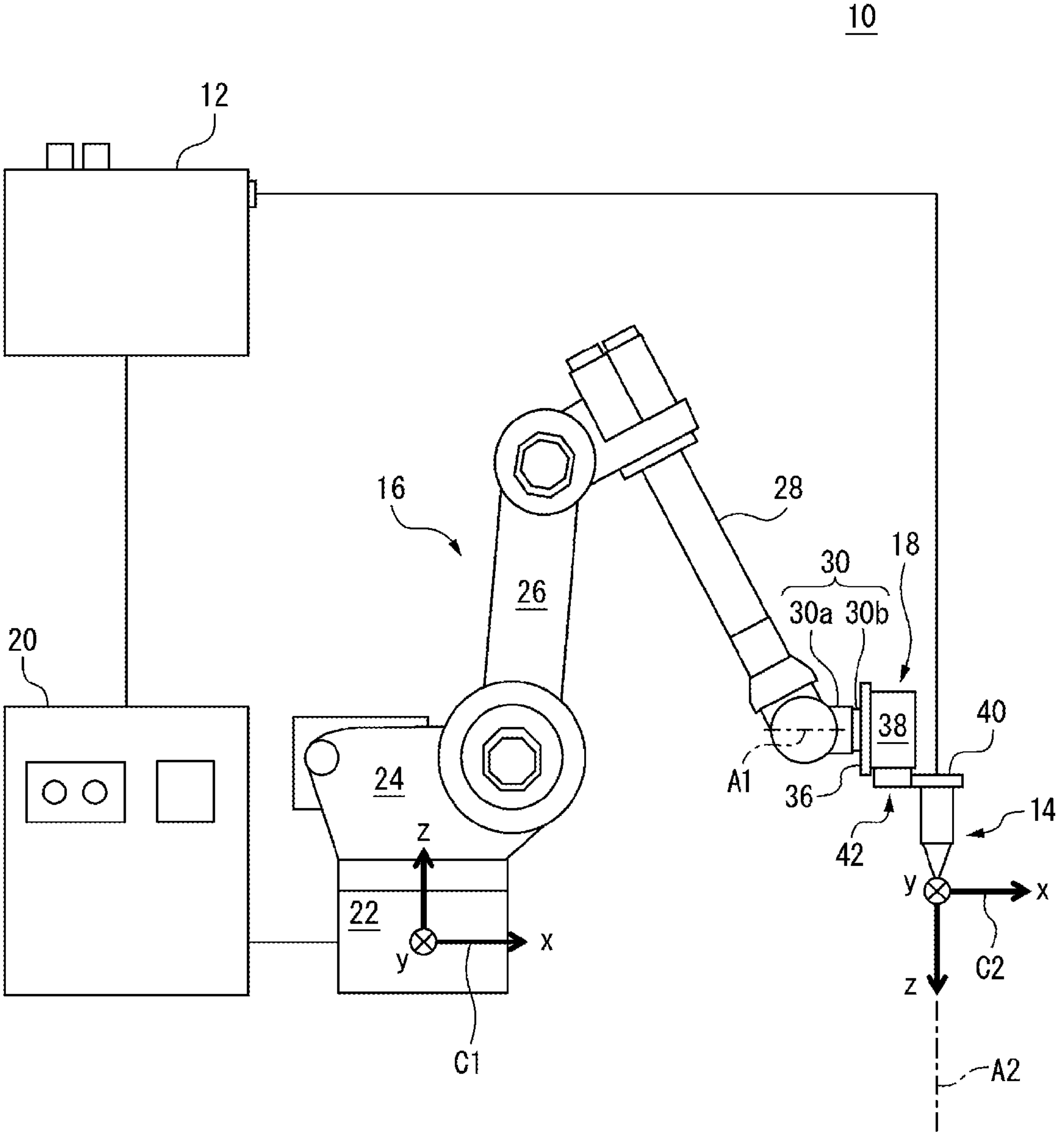
FIG. 1 is a schematic diagram of a machine system according to an embodiment.

Hereinafter, embodiments of the present disclosure will be described in detail with reference to the drawings. In various embodiments described below, the same elements are designated by the same reference numerals and duplicate description will be omitted. First, a machine system 10 according to an embodiment is described with reference to FIGS. 1 and 2. The machine system 10 includes a work machine 12, an end effector 14, a plurality of movement machines 16 and 18, and a control device 20.

The work machine 12 supplies an element EM used for work to the end effector 14. As an example, the work machine 12 is a laser oscillator that generates a laser beam EM1 as an element EM used for laser machining. In this case, the work machine 12 includes a solid-state laser oscillator (e.g., a YAG laser oscillator or a fiber laser oscillator) or a gas laser oscillator (e.g., a carbon dioxide laser oscillator); internally generates the laser beam EM1 through optical resonance in response to a command from the control device 20; and supplies the laser beam EM1 to the end effector 14.

As another example, the work machine 12 includes a wire feeding device that feeds a wire material EM2 (welding wire or brazing material) to the end effector 14 as an element EM used for welding or brazing. In this case, the work machine 12 includes a drum around which the wire material is wound, and an electric motor that feeds the wire material EM2 by rotating the drum in response to a command from the control device 20.

As still another example, the work machine 12 includes a coating material supplying device that supplies a coating material EM3 to the end effector 14 as an element EM used for coating. In this case, the work machine 12 includes a tank that stores the coating material EM3 and an electric pump that feeds the coating material EM3 from the tank in response to a command from the control device 20.

The end effector 14 outputs the element EM supplied from the work machine 12 along an output axis A2, and performs predetermined work on a workpiece (not illustrated) by using the element EM. As an example, in a case where the work machine 12 is a laser oscillator, the end effector 14 is a laser machining head that performs laser machining (laser welding, laser cutting, or the like) on a workpiece.

In this case, the end effector 14 includes a head body having a hollow center, a nozzle having a hollow center provided at a leading end of the head body, and an optical lens housed in the head body (none of which is illustrated); emits, along the output axis A2, the laser beam EM1 supplied from the work machine 12 in response to a command from the control device 20; and performs laser machining on a workpiece by using the laser beam EM1.

As another example, in a case where the work machine 12 is a wire feeding device, the end effector 14 is a welding device (a welding torch, a welding gun, or the like) that performs welding on a workpiece. In this case, the end effector 14 includes an electrode that generates electric discharge between the end effector 14 and the workpiece, and generates electric discharge by energizing the electrode in response to a command from the control device 20. At the same time, the end effector 14 feeds, along the output axis A2, the wire material EM2 (welding wire) supplied from the work machine 12, and welds the workpiece by using the wire material EM2.

Alternatively, the end effector 14 includes a heating device (burner, laser machining head, or the like) that heats the wire material EM2 (brazing material) supplied from the work machine 12, feeds the wire material EM2 along the output axis A2 in response to a command from the control device 20, and heats the wire material EM with the heating device to braze the workpiece.

As still another example, in a case where the work machine 12 is a coating material supplying device, the end effector 14 is a coating material applicator that performs coating on a workpiece. In this case, the end effector 14 includes an electric spray device that sprays the coating material EM3 fed from the work machine 12, and sprays the coating material EM3 along the output axis A2 in response to a command from the control device 20 to apply the coating material EM3 to the workpiece.

Each of the movement machines 16 and 18 can move the end effector 14. In the present embodiment, the movement machine 16 is a vertical articulated robot, and includes a robot base 22, a turning body 24, a lower arm 26, an upper arm 28, and a wrist 30. The robot base 22 is fixed to a floor of a work cell. The turning body 24 is provided at the robot base 22 so as to be turnable about a vertical axis.

The lower arm 26 is provided at the turning body 24 so as to be rotatable about a horizontal axis. The upper arm 28 is provided at a leading end of the lower arm 26 so as to be rotatable about two axes orthogonal to each other. The wrist 30 includes a wrist base **30*a* rotatably provided at a leading end of the upper arm 28, and a wrist flange 30*b* provided at the wrist base 30*a*** so as to be rotatable about a wrist axis A1.

The movement machine 16 further includes a plurality of servo motors 32 (FIG. 2) and a plurality of sensors 34 respectively provided at the plurality of servo motors 32. Each of the plurality of servo motors 32 is provided at the robot base 22, the turning body 24, the lower arm 26, the upper arm 28, and the wrist 30.

The servo motors 32 drive respective movable elements (the turning body 24, the lower arm 26, the upper arm 28, the wrist 30, and the wrist flange **30*b*) of the movement machine 16 in response to a command from the control device 20. Accordingly, the movement machine 16 moves the movement machine 18 and the end effector 14. Each of the sensors 34 is, for example, a rotation detection sensor (encoder, Hall element, or the like) that detects rotation (rotation position or rotation angle) of a rotary shaft of the servo motor 32, and supplies data related to the detected rotation to the control device 20** as feedback FB1.

Figure 2:
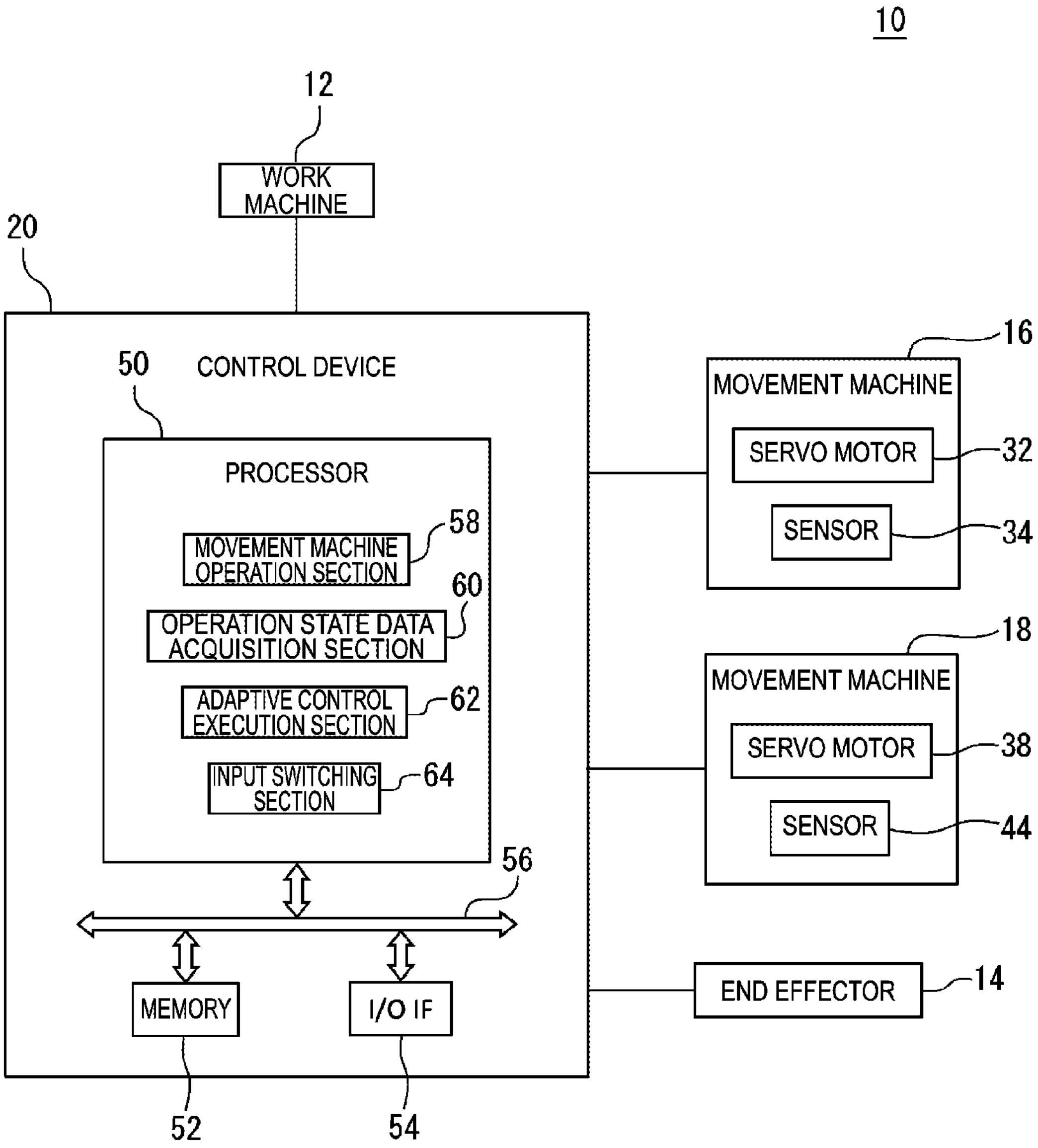
FIG. 2 is a block diagram of the machine system illustrated in FIG. 1.
Figure 3:
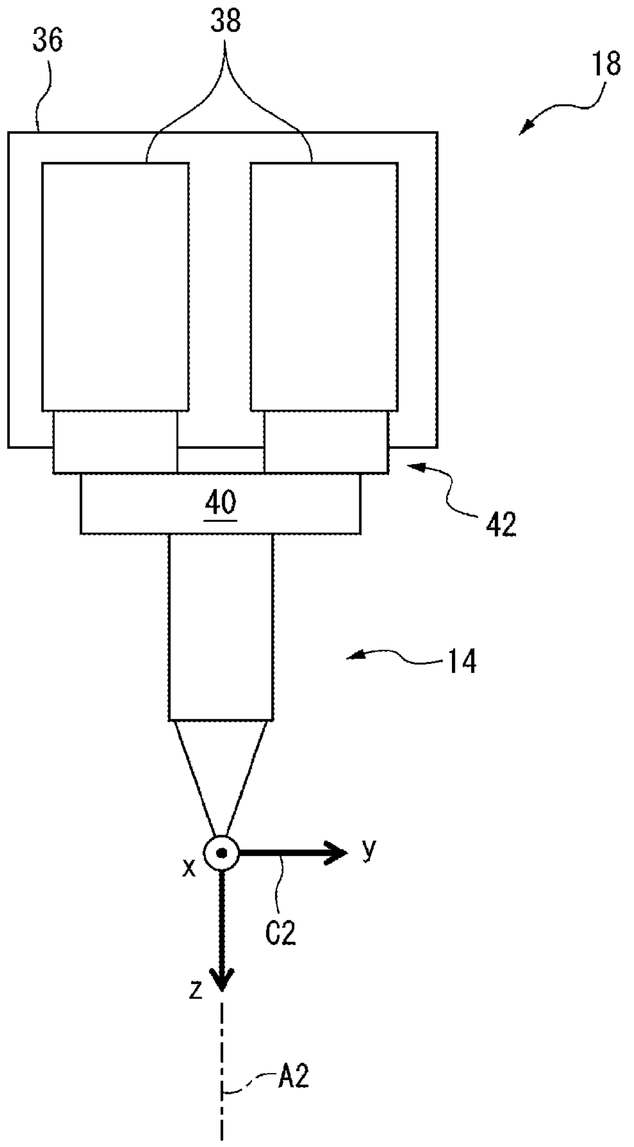
FIG. 3 is an enlarged diagram of the end effector illustrated in FIG. 1.

The movement machine 18 is provided at the wrist flange **30*b* of the movement machine 16. Specifically, as illustrated in FIGS. 1 and 3, the movement machine 18 includes a housing 36, a plurality of servo motors 38, an adapter 40, a motion conversion mechanism 42, and a plurality of sensors 44 (FIG. 2). The housing 36 is removably attached to the wrist flange 30*b*. Each of the servo motors 38 is fixed to the housing 36**.

The end effector 14 is removably attached to the adapter 40. The motion conversion mechanism 42 converts a rotational motion of a rotary shaft of each of the servo motors 38 into a translational motion of the adapter 40 in a direction orthogonal to the output axis A2 of the end effector 14. In this way, the servo motors 38 rotate the respective rotary shafts in response to a command from the control device 20, and thereby translate the adapter 40 and the end effector 14 in the direction orthogonal to the output axis A2 via the motion conversion mechanism 42.

Each of the sensors 44 is provided at the corresponding one of the servo motors 38. The sensor 44 is, for example, a rotation detection sensor (encoder, Hall element, or the like) that detects rotation (rotation position or rotation angle) of a rotary shaft of the servo motor 38, and supplies data related to the detected rotation to the control device 20 as feedback FB2.

As illustrated in FIG. 2, the control device 20 is a computer including a processor 50, a memory 52, and an I/O interface 54. The processor 50 is communicably connected to the memory 52 and the I/O interface 54 via a bus 56, and communicates with these components to perform arithmetic processing for implementing various types of functions to be described below.

The memory 52 includes a RAM or a ROM and temporarily or permanently stores various types of data used for the arithmetic processing executed by the processor 50 and various types of data generated during the arithmetic processing. The I/O interface 54 includes, for example, an Ethernet (trade name) port, a USB port, an optical fiber connector, or an HDMI (trade name) terminal and performs wired or wireless data communications with an external device under a command from the processor 50. The work machine 12, the end effector 14, the movement machine 16 (the servo motor 32 and the sensor 34), and the movement machine 18 (the servo motor 38 and the sensor 44) described above are communicably connected to the I/O interface 54.

As illustrated in FIG. 1, a robot coordinate system C1 is set for the movement machine 16. The robot coordinate system C1 is a coordinate system for automatically controlling the operation of each of the movable elements of the movement machine 16. In the present embodiment, the robot coordinate system C1 is fixed relative to the robot base 22 such that the origin of the robot coordinate system C1 is arranged at the center of the robot base 22 and the z-axis of the robot coordinate system C1 is parallel to the vertical direction.

On the other hand, a tool coordinate system C2 is set for the end effector 14. The tool coordinate system C2 is a coordinate system for defining the position of the end effector 14 in the robot coordinate system C1. In the present embodiment, the tool coordinate system C2 is set relative to the end effector 14 such that the origin (so-called TCP) of the tool coordinate system C2 is arranged at a working point (e.g., an exit port of the laser beam EM1, a welding position of the wire material EM2, or a spray port of the coating material EM3) of the end effector 14, and the z axis of the tool coordinate system C2 is orthogonal to the wrist axis A1 (or coincident with the output axis A2).

When moving the end effector 14, the control device 20 sets the tool coordinate system C2 in the robot coordinate system C1, and generates an operation command OC (a position command, speed command, torque command, or the like) for each of the servo motors 32 of the movement machine 16 or each of the servo motors 38 of the movement machine 18 so as to arrange the end effector 14 at a position represented by the set tool coordinate system C2. Accordingly, the control device 20 can move the movement machine 16 and the movement machine 18 and position the end effector 14 at any position in the robot coordinate system C1. Note that, in the present description, "position" may refer to a position and an orientation.

Next, an operation flow of the machine system 10 will be described. The processor 50 performs work (laser machining, welding, brazing, coating, or the like) on a workpiece in accordance with a work program PG stored in the memory 52 in advance. The work program PG is a computer program that causes the processor 50 to implement a function for work to be described below. A table schematically showing an example of the work program PG is shown below.

TABLE 1

| | | |
|---|---|---|
| 0 | START | |
| 1 | Move to Teaching point [P1] | Speed [V1] |
| 2 | End effector [ON] | |
| 3 | Move to Teaching point [P2] | Speed [V2] |
| 4 | Start adaptive control [Movement machine 16] | |
| 5 | Move to Teaching point [P3] | Speed [V3] |
| 6 | Move to Teaching point [P4] | Speed [V4] |
| 7 | Start adaptive control [Movement machine 18] | |
| 8 | Move to Teaching point [P5] | Speed [V5] |
| 9 | Move to Teaching point [P6] | Speed [V6] |
| 10 | END | |

In the example shown in Table 1, a teaching point Pn (n=1, 2, 3, 4, 5, or 6) at which the end effector 14 (i.e., the origin of the tool coordinate system: TCP) is to be positioned in the robot coordinate system C1, and a speed Vn at which the end effector 14 is moved to the teaching point Pn are defined in the work program PG. In other words, the statement "Move to Teaching point [P1] and Speed [V1]" in the first row of the work program PG means a command for causing the end effector 14 (TCP) to move to the teaching point P1 at the speed V1.

The statement "End effector [ON]" in the second row of the work program PG is a command for causing the work machine 12 to operate and supply the element EM (the laser beam EM1, the wire material EM2, the coating material EM3, or the like) to the end effector 14 and causing the end effector 14 to output the element EM at an output value OP.

As an example, in a case where the end effector 14 is a laser machining head, the output value OP can be a laser power of the laser beam EM1 supplied by the work machine 12 to the end effector 14. As another example, in a case where the end effector 14 is a welding device, the output value OP can be a feeding rate of the wire material EM2 supplied by the work machine 12 to the end effector 14. As still another example, in a case where the end effector 14 is a coating material applicator, the output value OP can be a flow rate (or pressure) of the coating material EM3 supplied by the work machine 12 to the end effector 14.

The processor 50 analyzes the work program PG, sequentially reads and executes each statement defined in the work program PG, and thereby performs work on the workpiece. In the present embodiment, the processor 50 causes the end effector 14 to move to the teaching point TPn by sequentially operating the plurality of movement machines 16 and 18 one by one.

Specifically, in the work program PG, when the end effector 14 is moved to the teaching points P1, P2, P3, and P4, the processor 50 operates the movement machine 16 in a state where the movement machine 18 is stopped so as to move the end effector 14 through the operation of only the movement machine 16.

On the other hand, when the end effector 14 is moved to the teaching points P5 and P6, the processor 50 operates the movement machine 18 in a state where the movement machine 16 is stopped so as to move the end effector 14 through the operation of only the movement machine 18. In this way, in the present embodiment, the processor 50 functions as a movement machine operation section 58 (FIG. 2) that moves the end effector 14 by operating the plurality of movement machines 16 and 18.

Hereinafter, an operation flow of the machine system 10 when the work program PG shown in Table 1 is executed will be specifically described. After the start of the work program PG, the processor 50 first reads the statement in the first row, generates an operation command OC1 (a position command, a speed command, a torque command, or the like) for the servo motor 32 of the movement machine 16, and moves the end effector 14 to the teaching point P1 at the speed V1 through the operation of the movement machine 16.

At this time, the processor 50 acquires the feedback FB1 from the sensor 34, determines a position of the end effector 14 (TCP) in the robot coordinate system C1 based on the feedback FB1, and determines whether or not the end effector 14 (TCP) has reached the teaching point P1 based on the position.

When the end effector 14 reaches the teaching point P1, the processor 50 reads the statement in the second row and turns "ON" the operation of the end effector 14. The processor 50 then transmits an output command $OP_C$ to the work machine 12 to operate the work machine 12, and causes the end effector 14 to output the element EM at the output value OP corresponding to the output command $OP_C$.

In this way, the processor 50 starts up the end effector 14 to perform work on the workpiece by using the element EM. Next, the processor 50 reads the statement in the third row, operates the movement machine 16 in response to the operation command OC1, and moves the end effector 14 to the teaching point P2 at the speed V2.

When the end effector 14 is moved to the teaching point P2, the processor 50 reads the statement "Start adaptive control [Movement machine 16]" in the fourth row. This statement gives the processor 50 an adaptive control start command AD1 for executing a first adaptive control AC1 to adjust the output value OP of the end effector 14 in response to operation state data OD1 of the movement machine 16. Here, the operation state data OD1 is data indicating the operation state of the movement machine 16 operated by the processor 50 (the movement machine operation section 58).

As an example, the operation state data OD1 includes a position $P_A$, a speed $V_A$, an acceleration aa, a distance $d_A$ to a teaching point Pn, and a movement time to of the movement machine 16. The position $P_A$ of the movement machine 16 includes, for example, a position (specifically, coordinates), in the robot coordinate system C1, of the end effector 14 (or the wrist flange 30*b* of the movement machine 16) moved by the movement machine 16. For example, the processor 50 can acquire the position $P_A$ from the operation command OC1 (e.g., a position command) for operating the movement machine 16. Alternatively, the processor 50 can determine the position $P_A$ based on the feedback FB1 from the sensor 34.

The speed $V_A$ of the movement machine 16 includes, for example, a speed of the end effector 14 (TCP) moved by the movement machine 16. The processor 50 can acquire the speed $V_A$ from the operation command OC1 (e.g., a speed command). Alternatively, the processor 50 can determine the speed $V_A$ based on the feedback FB1 from the sensor 34.

The acceleration as of the movement machine 16 includes, for example, an acceleration of the end effector 14 (TCP) moved by the movement machine 16. The processor 50 can acquire the acceleration as from the operation command OC1 (e.g., a time derivative of a speed command). Alternatively, the processor 50 can determine the acceleration as based on the feedback FB1 from the sensor 34.

The distance $d_A$ to the teaching point Pn of the movement machine 16 includes, for example, a distance from the end effector 14 (TCP) moved by the movement machine 16 to a teaching point Pn at which the end effector 14 is to be positioned next. The processor 50 can acquire the distance $d_A$ from the operation command OC1 (e.g., a position command) and position data of the teaching point Pn. Alternatively, the processor 50 can acquire the distance $d_A$ from the position $P_A$ determined based on the feedback FB1 from the sensor 34 and the position data of the teaching point Pn.

The movement time $t_A$ of the movement machine 16 includes, for example, a time elapsed after the movement machine 16 passes through a teaching point Pn in moving from the teaching point Pn to a teaching point Pn+1. The processor 50 can acquire the movement time $t_A$ from the operation command OC1 (e.g., a position command) and a time measured by a clocking section (not illustrated) provided at the control device 20. Alternatively, the processor 50 can acquire the movement time $t_A$ from the position $P_A$ determined based on the feedback FB1 from the sensor 34 and the time measured by the clocking section.

As described above, the processor 50 acquires the operation state data OD1 (the position $P_A$, the speed $V_A$, the acceleration aa, the distance $d_A$, or the movement time $t_A$) of the movement machine 16 based on the operation command OC1 for operating the movement machine 16 or the feedback FB1 supplied from the movement machine 16 to the control device 20 when the movement machine 16 is operated. Thus, the processor 50 functions as an operation state data acquisition section 60 (FIG. 2) that acquires the operation state data OD1.

When the adaptive control start command AD1 is received from the work program PG, the processor 50 switches a movement machine from which operation state data OD is to be acquired for the adaptive control to the movement machine 16 specified in the statement "Start adaptive control [Movement machine 16]", and starts an operation of acquiring the operation state data OD1 of the movement machine 16.

The processor 50 then starts the first adaptive control AC1 to adjust the output value OP in response to the operation state data OD1. After the start of the first adaptive control AC1, the processor 50 activates an adaptive control program created in advance, applies the acquired operation state data OD1 to the adaptive control program, and calculates the output value OP as needed.

The processor 50 executes the first adaptive control AC1 when the movement machine 16 moves the end effector 14 to the teaching points P3 and P4 (the statements in the fifth and sixth rows of the work program PG). As an example, as the first adaptive control AC1, the processor 50 adjusts the output value OP in response to the speed $V_A$ so as to increase the output value OP as the speed $V_A$ increases.

Specifically, for example, when the end effector 14 is moved from the teaching point P3 to the teaching point P4, the processor 50 may increase the output value OP to the output command $OP_C$ (or increase the output value OP at a predetermined rate from the output command $OP_C$) in response to the acceleration of the end effector 14 to the speed V4.

As another example, as the first adaptive control AC1, the processor 50 increases the output value OP in response to the position $P_A$ until the position $P_A$ advances by a predetermined distance after passing through the teaching point Pn. Specifically, the processor 50 increases the output value OP in response to the position $P_A$ such that the output value OP reaches the output command $OP_C$ when the end effector 14 reaches a position 10 mm forward from the teaching point P3 after passing through the teaching point P3.

Alternatively, the processor 50 may decrease the output value OP in response to the position $P_A$ until the position $P_A$ reaches a next teaching point Pn from a position a predetermined distance short of the next teaching point Pn. Specifically, when moving the end effector 14 from the teaching point P3 to the teaching point P4, the processor 50 may decrease the output value OP from the output command $OP_C$ in response to the position $P_A$ after the end effector 14 reaches a position 10 mm short of the teaching point P4 and until the end effector 14 reaches the teaching point P4.

As still another example, as the first adaptive control AC1, the processor 50 increases the output value OP in response to the movement time $t_A$ until the movement time $t_A$ after passing through the teaching point Pn reaches a predetermined time. Specifically, the processor 50 increases the output value OP in response to the movement time $t_A$ such that the output value OP reaches the output command $OP_C$ when the movement time $t_A$ after passing through the teaching point P3 reaches 5 seconds (i.e., when 5 seconds have elapsed after passing through the teaching point P3).

As still another example, as the first adaptive control AC1, the processor 50 may increase the output value OP to the output command $OP_C$ (or decrease the output value OP from the output command $OP_C$) as the acceleration as increases (or decreases). In this way, in the present embodiment, the processor 50 adjusts the output value OP based on the output command $OP_C$ in response to the operation state data OD1 (the position $P_A$, the speed $V_A$, the acceleration aa, the distance $d_A$, or the movement time $t_A$) in the first adaptive control AC1. Thus, the processor 50 functions as an adaptive control execution section 62 (FIG. 2) that adjusts the output value OP in response to the operation state data OD1.

When the end effector 14 is moved to the teaching point P4, the processor 50 reads the statement "Start adaptive control [Movement machine 18]" in the seventh row. This statement gives the processor 50 an adaptive control start command AD2 for executing a second adaptive control AC2 to adjust the output value OP in response to operation state data OD2 of the movement machine 18.

The operation state data OD2 is data indicating the operation state of the movement machine 18 by the processor 50, and, similarly to the operation state data OD1 described above, includes a position $P_B$, a speed $V_B$, an acceleration $\alpha_B$, a distance $d_B$ to a teaching point Pn, and a movement time $t_B$ of the movement machine 18 (specifically, the end effector 14 or a TCP moved by the movement machine 18).

The processor 50 functions as the operation state data acquisition section 60, and can acquire the position $P_B$, the speed $V_B$, the acceleration $\alpha_B$, the distance $d_B$, and the movement time $t_B$ based on an operation command OC2 for operating the movement machine 18 (the servo motor 38) or the feedback FB2 from the sensor 44.

Specifically, the processor 50 can acquire the position $P_B$ from the operation command OC2 (a position command) for operating the movement machine 18, or determine the position $P_B$ based on the feedback FB1 from the sensor 34 and the feedback FB2 from the sensor 44. The processor 50 can acquire the speed $V_B$, the acceleration $\alpha_B$, the distance $d_B$, and the movement time $t_B$ based on the operation command OC2 or the feedback FB1 and the feedback FB2 through a method similar to the method of acquiring the speed $V_A$, the acceleration aa, the distance $d_A$, and the movement time to described above.

When the adaptive control start command AD2 is received from the work program PG, the processor 50 switches a movement machine from which operation state data OD is to be acquired for the adaptive control from the movement machine 16 to the movement machine 18 specified in the statement "Start adaptive control [Movement machine 18]", and starts an operation of acquiring the operation state data OD2 of the movement machine 18. In this way, in the present embodiment, the processor 50 functions as an input switching section 64 that switches a movement machine from which operation state data OD is to be acquired from the movement machine 16 to the movement machine 18 in response to a predetermined command (the adaptive control start command AD2).

When the end effector 14 is moved to the teaching points P5 and P6 through the operation of the movement machine 18 (the statements in the eighth and ninth rows of the work program PG), the processor 50 then executes the second adaptive control AC2 to adjust the output value OP in response to the operation state data OD2 (the position $P_B$, the speed $V_B$, the acceleration $\alpha_B$, the distance $d_B$, and the movement time $t_B$) similarly to the first adaptive control AC1 described above. When a work end command indicated by the statement "END" in the tenth row of the work program PG is received, the processor 50 stops the operations of the work machine 12, the end effector 14, and the movement machine 18, and thereby ends the work.

As described above, in the present embodiment, the processor 50 functions as the input switching section 64 and can dynamically switch a movement machine from which operation state data OD is to be acquired between the plurality of movement machines 16 and 18 in response to an adaptive control command AD. According to this configuration, a common work program PG can be used for the plurality of movement machines 16 and 18, and the first adaptive control AC1 and the second adaptive control AC2 can be dynamically switched between during the execution of the work program PG. Accordingly, the work program PG can be simplified.

In the present embodiment, the processor 50 receives the adaptive control start commands AD1 and AD2 from the work program PG. According to this configuration, the processor 50 can automatically switch a movement machine from which operation state data OD is to be acquired between the movement machines 16 and 18 in response to a command AD from the work program PG, and thereby automatically switch between the first adaptive control AC1 and the second adaptive control AC2.

In an example of the present embodiment, the processor 50 acquires the operation state data OD based on the operation command OC for operating the movement machines 16 and 18. In this case, the processor 50 can acquire the operation command OC before operating the movement machines 16 and 18, and can thus quickly execute an adaptive control AC using the operation command OC.

Note that in a case where the operation state data OD acquired from the operation command OC is used to execute the adaptive control AC, the processor 50 may acquire the operation state data OD from the operation command OC when a predetermined time $t_D$ has elapsed after transmitting the operation command OC to the movement machines 16 and 18, and execute the adaptive control AC in response to the operation state data OD. The predetermined time $t_D$ can be determined while taking into consideration a delay from when the operation command OC is transmitted and until the movement machines 16 and 18 actually start moving the end effector 14.

In another example of the present embodiment, the processor 50 acquires the operation state data OD based on the feedback FB supplied from each of the movement machines 16 and 18 (specifically, the sensors 34 and 44) to the control device 20 when the movement machines 16 and 18 are operated. According to this configuration, the processor 50 can execute the adaptive control AC by using the operation state data OD that accurately represents the actual operation of each of the movement machines 16 and 18.

Note that the functions of the movement machine operation section 58, the operation state data acquisition section 60, the adaptive control execution section 62, and the input switching section 64 described above are functional modules implemented by a computer program (i.e., the work program PG) executed by the processor 50. The computer program (the work program PG) may be provided as being recorded in a computer-readable recording medium such as a semiconductor memory, a magnetic recording medium, or an optical recording medium.

Figure 4:
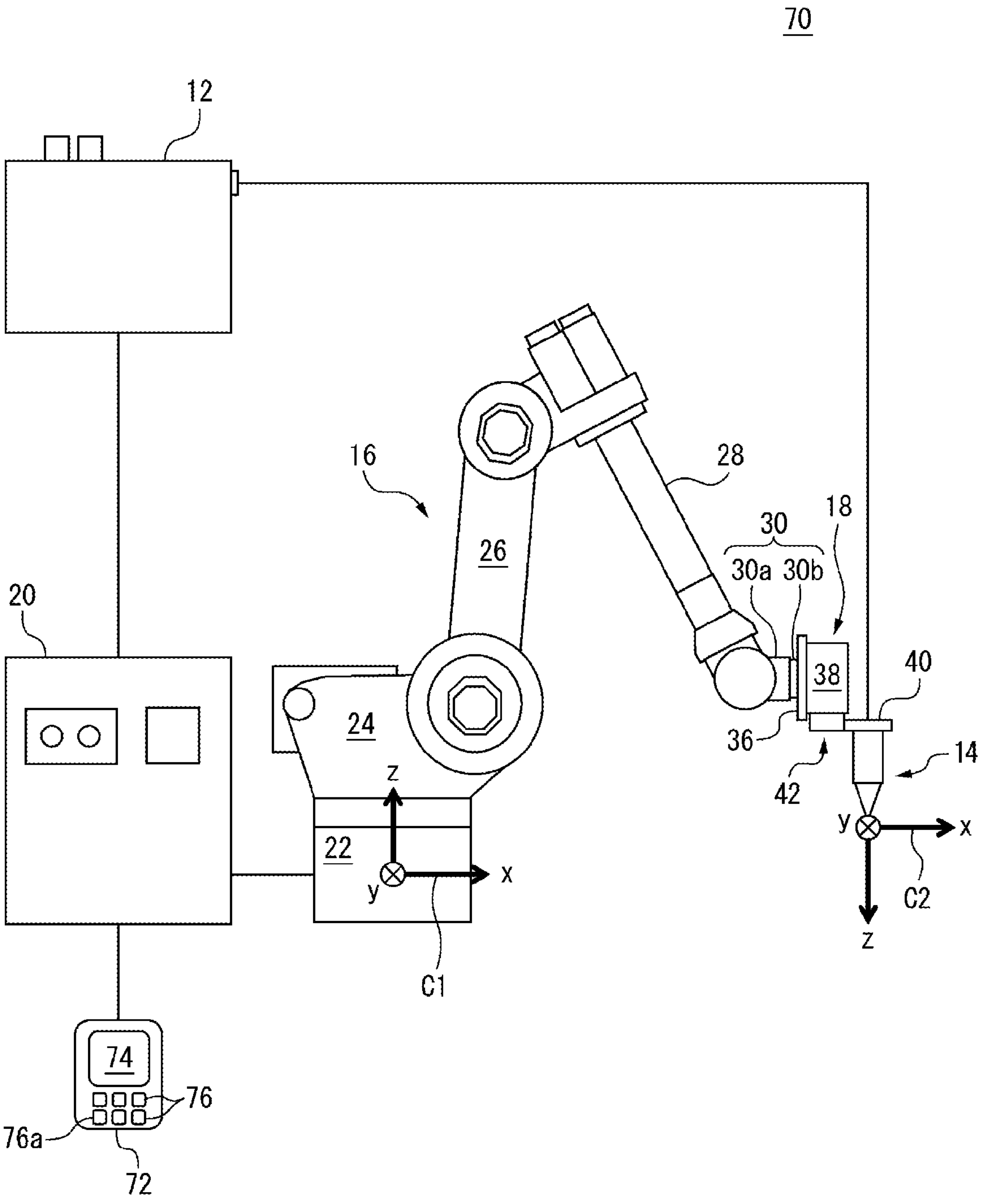
FIG. 4 is a schematic diagram of a machine system according to another embodiment.
Figure 5:
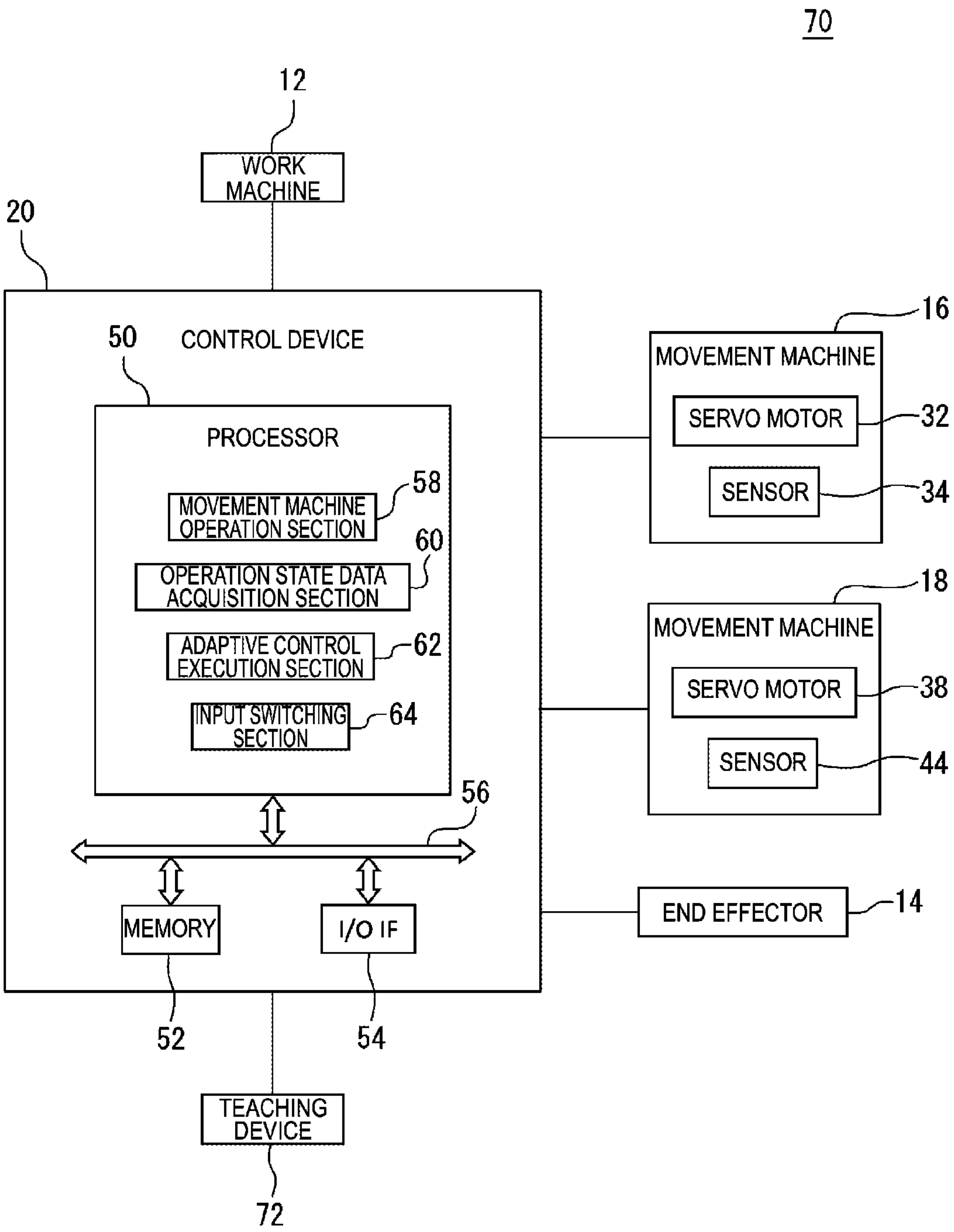
FIG. 5 is a block diagram of the machine system illustrated in FIG. 4.

Next, a machine system 70 according to another embodiment will be described with reference to FIGS. 4 and 5. The machine system 70 is different from the machine system 10 described above in that the machine system 70 further includes a teaching device 72. The teaching device 72 is, for example, a portable computer such as a teaching pendant or a tablet terminal device and includes a display 74 (an LCD, an organic EL display, or the like), an operating part 76 (a push button, a touch sensor, or the like), and a processor and a memory (none of which is illustrated). The teaching device 72 is communicably connected to the I/O interface 54 in a wireless or a wired manner.

An operator can cause the movement machines 16 and 18 to perform a jog operation by operating the operating part 76 while visually confirming an image displayed on the display 74. The operator can teach a series of operations for work to the movement machines 16 and 18 by causing the movement machines 16 and 18 to perform the jog operation by using the teaching device 72, and can thereby create the work program PG.

For example, in a case of creating the work program PG shown in Table 1, the operator operates the operating part 76 to send, from the teaching device 72 to the control device 20, a teaching command for causing the movement machine 16 to perform the jog operation. In doing so, the processor 50 of the control device 20 functions as the movement machine operation section 58, generates the operation command OC1 for the movement machine 16 in response to the teaching command, and causes the movement machine 16 to perform the jog operation. In this way, the operator can teach the teaching points P1, P2, P3, and P4 at which the movement machine 16 positions the end effector 14, and write the statements indicated in the first row, the third row, the fifth row, and the sixth row in Table 1 into the work program PG.

Similarly, the operator operates the operating part 76 to send a teaching command for causing the movement machine 18 to perform a jog operation from the teaching device 72 to the control device 20. In response to the teaching command, the processor 50 functions as the movement machine operation section 58, generates the operation command OC2 for the movement machine 18, and causes the movement machine 18 to perform the jog operation.

In this way, the operator can teach the teaching points P5 and P6 at which the movement machine 18 positions the end effector 14, and write the statements indicated in the eighth row and the ninth row in Table 1 into the work program PG. The operator can write the statement indicated in the second row in Table 1 into the work program PG by operating the operating part 76.

In the present embodiment, the operating part 76 includes an operating part 76*a* assigned to teach the adaptive control AC. For example, when the operator operates the operating part 76*a* to teach the first adaptive control AC1 after teaching the teaching point P2 indicated in the third row in Table 1, the teaching device 72 transmits the adaptive control start command AD1 to the control device 20.

When the adaptive control start command AD1 is received, the processor 50 functions as the input switching section 64 and switches a movement machine from which operation state data OD is to be acquired to the movement machine 16. The processor 50 then functions as the operation state data acquisition section 60 to start acquiring the operation state data OD1, and as the adaptive control execution section 62 to start the first adaptive control AC1. At the same time, a processor of the teaching device 72 (or the processor 50) automatically writes the statement "Start adaptive control [Movement machine 16]" indicated in the fourth row in Table 1 into the work program PG.

When the operator operates the operating part 76*a* to teach the second adaptive control AC2 after teaching the teaching point P4 indicated in the sixth row in Table 1, the teaching device 72 transmits the adaptive control start command AD2 to the control device 20. When the adaptive control start command AD2 is received, the processor 50 functions as the input switching section 64 and switches a movement machine from which operation state data OD is to be acquired from the movement machine 16 to the movement machine 18.

The processor 50 then functions as the operation state data acquisition section 60 to start acquiring the operation state data OD2 after the switching, and as the adaptive control execution section 62 to start the second adaptive control AC2. At the same time, the processor of the teaching device 72 (or the processor 50) automatically writes the statement "Start adaptive control [Movement machine 18]" indicated in the seventh row in Table 1 into the work program PG.

As described above, in the present embodiment, the processor 50 receives adaptive control commands AC from the teaching device 72 for teaching operations to the movement machines 16 and 18, and switches a movement machine from which operation state data OD is to be acquired between the movement machines 16 and 18. According to this configuration, the operator can teach the switching between the adaptive controls AC through a simple operation, and can easily create a work program PG shared between the movement machines 16 and 18.

Note that the operating part 76 of the teaching device 72 may include an operating part 76*b* assigned to switch to the movement machine from which operation state data OD is to be acquired. In this case, when the operator operates the operating part 76*b*, the processor 50 receives a movement machine switching command from the teaching device 72, functions as the input switching section 64, and switches a movement machine from which operation state data OD is to be acquired from the movement machine 16 to the movement machine 18. In conjunction with this movement machine switching operation, the processor 50 may function as the operation state data acquisition section 60 to automatically start acquiring the operation state data OD after the switching, and as the adaptive control execution section 62 to automatically start the second adaptive control AC2.

Figure 6:
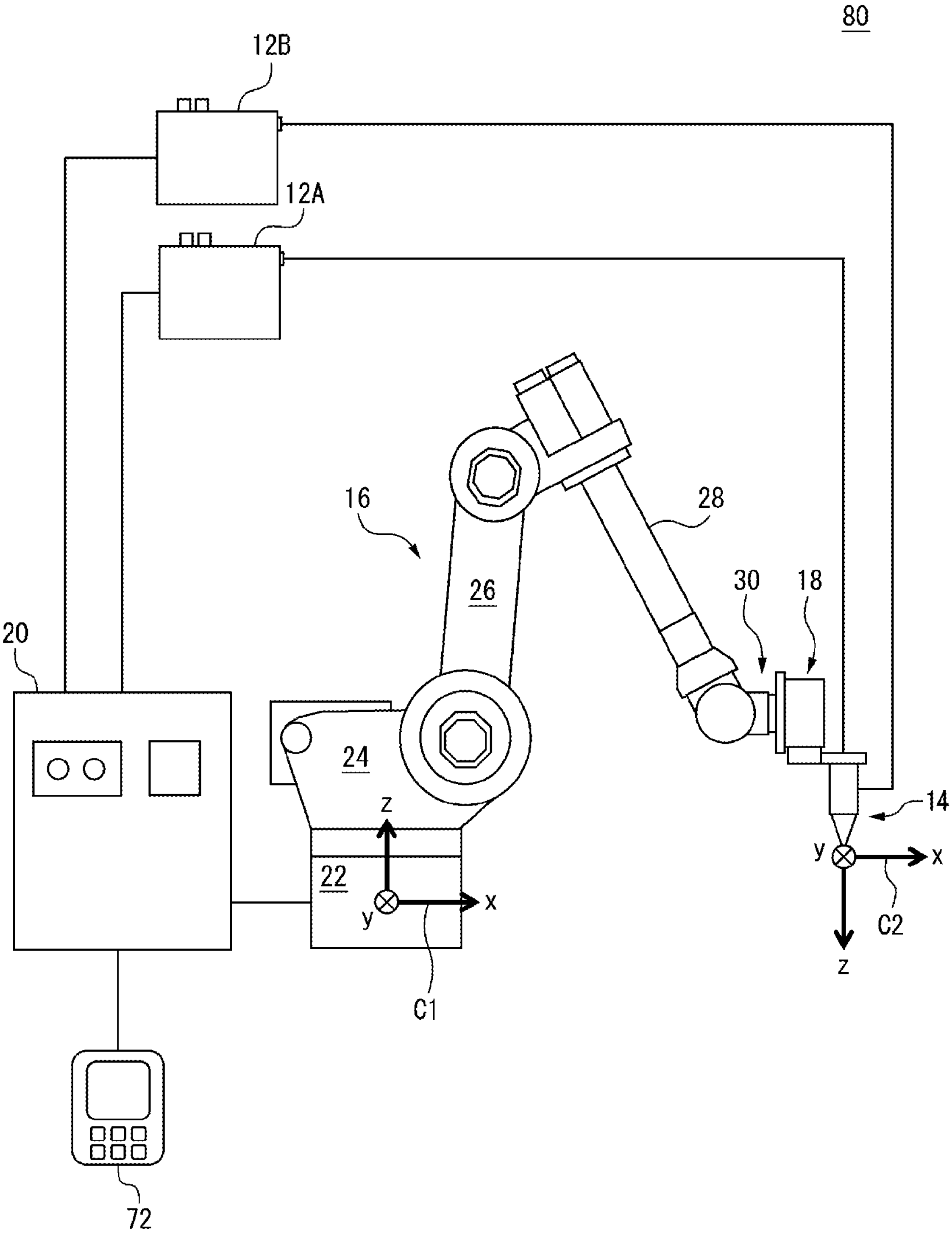
FIG. 6 is a schematic diagram of a machine system according to still another embodiment.
Figure 7:
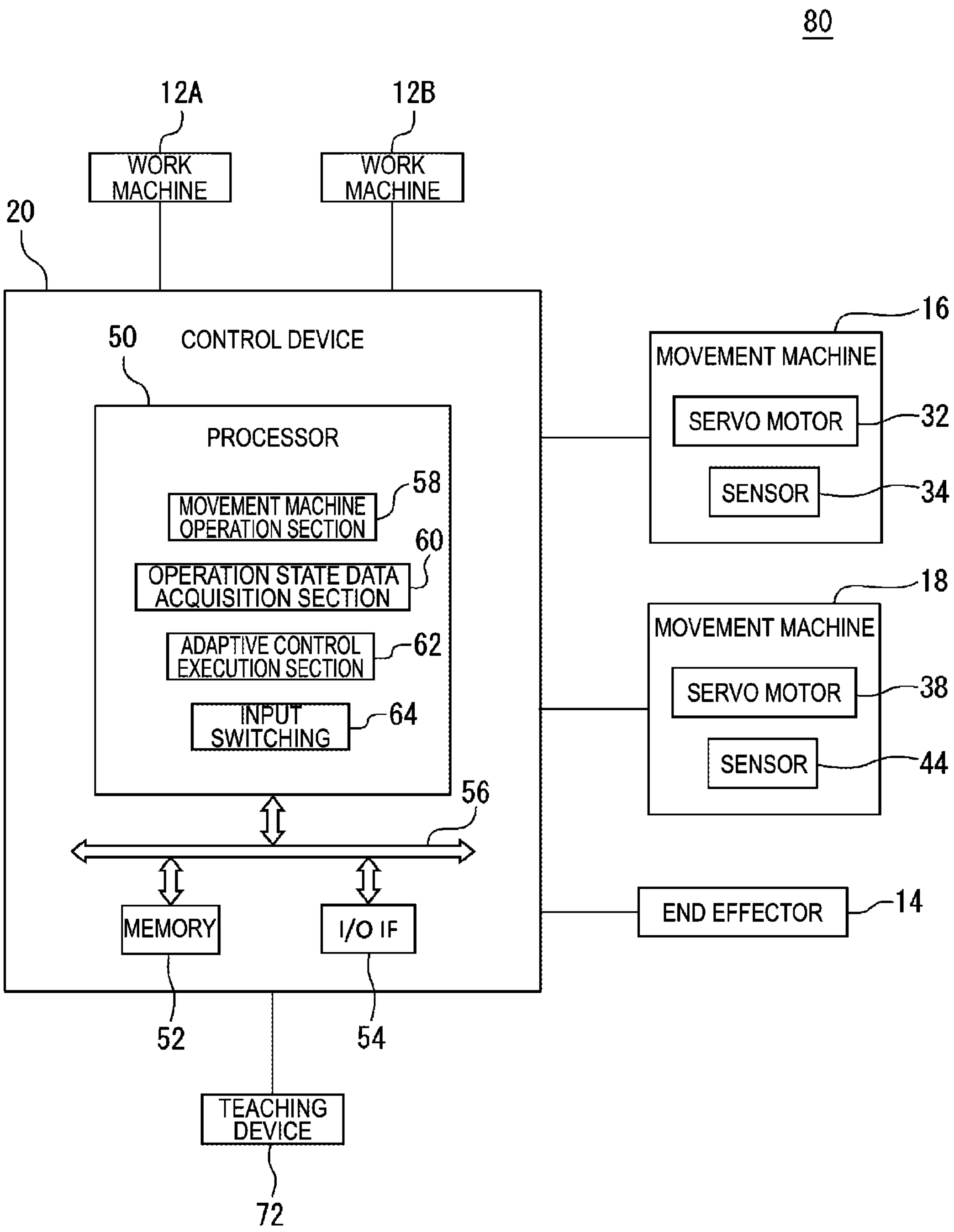
FIG. 7 is a block diagram of the machine system illustrated in FIG. 6.

Note that the machine system 10 or 70 may include a plurality of work machines 12. Such an embodiment is illustrated in FIGS. 6 and 7. A machine system 80 illustrated in FIGS. 6 and 7 is different from the machine system 70 described above in that the machine system 80 includes a plurality of work machines 12A and 12B. For example, the work machine 12A is a laser oscillator that supplies the laser beam EM1 to the end effector 14, and the work machine 12B is a wire feeding device that feeds the wire material EM2 as a brazing material to the end effector 14.

In this case, the end effector 14 can be a laser machining head as a heating device that heats the wire material EM2 supplied from the work machine 12B with the laser beam EM1 supplied from the work machine 12A. The end effector 14 outputs the laser beam EM1 supplied from the work machine 12A along an output axis $A2_{\_1}$ at an output value OP1 and outputs the wire material EM2 supplied from the work machine 12B along an output axis $A2_{\_2}$ at an output value OP2 in response to a command from the control device 20.

In the adaptive control AC, the processor 50 then adjusts the output value OP1 of the end effector 14 based on an output command $OP_{C\_1}$ for the output value OP1 and adjusts the output value OP2 based on an output command $OP_{C\_2}$ for the output value OP2 in response to the operation state data OD of each of the movement machines 16 and 18. In this way, the processor 50 may adaptively control the plurality of output values OP1 and OP2 different from each other in response to the operation state data OD.

Note that the work machine 12B may be a gas supplying device that supplies an assist gas to the end effector 14, and the end effector 14 may be a laser machining head that performs laser machining on a workpiece with the laser beam EM1 supplied from the work machine 12A when blowing the assist gas supplied from the work machine 12B to the workpiece. Alternatively, the machine system 80 may further include a work machine 12C as a gas supplying device in addition to the work machines 12A and 12B.

The work program PG shown in Table 1 described above is only an example, and the number of characters and the number of rows (i.e., the number of processes) of the statements defined can be determined at will by an operator depending on the work to be performed. For example, a statement "Start adaptive control [Movement machine 16]", which is the same as the statement in the fourth row, may be added to the row following the statement in the ninth row in Table 1.

In this case, after the end effector 14 is positioned at the teaching point P6 by the movement machine 18, the processor 50 switches a movement machine from which operation state data OD is to be acquired from the movement machine 18 to the movement machine 16, starts an operation of acquiring the operation state data OD1 of the movement machine 16, and starts the first adaptive control AC1.

The statement in the fourth row in Table 1 may be defined as, for example, a statement "Switch movement machine [Movement machine 16]" that gives the processor 50 a switching command for switching a movement machine from which operation state data OD is to be acquired to the movement machine 16. In this case, when the switching command from the statement is received, the processor 50 may perform the operation of switching a movement machine, the operation state data OD of which is to be acquired to the movement machine 16, and start the first adaptive control AC1 in conjunction with the switching operation.

Similarly, the statement in the seventh row in Table 1 may be defined as a statement "Switch movement machine [Movement machine 18]" that gives the processor 50 a switching command for switching a movement machine from which operation state data OD is to be acquired to the movement machine 18. In this case, the processor 50 may perform an operation of switching a movement machine, the operation state data OD of which is to be acquired, to the movement machine 18 in response to the switching command, and may start the second adaptive control AC2 in conjunction with the switching operation.

The sensor 34 or 44 may include a torque sensor that detects a load torque applied to the rotary shaft of the servo motor 32 or 38, or a current sensor that detects a drive current of the servo motor 32 or 38; and may supply the detected load torque or the detected drive current to the control device as the feedback FB1 or FB2. The processor 50 may then acquire the operation state data OD1 or OD2 (e.g., acceleration) based on the feedback FB1 or FB2.

Work performed by the machine systems 10, 70, and 80 are not limited to laser machining, welding, brazing, or coating as described above, and may be any other work; and the work machine 12 and the end effector 14 may be any type of device for performing the work.

In the embodiments described above, cases in which the movement machine 18 is provided at the movement machine 16 and is moved by the movement machine 16 has been described. However, the present disclosure is not limited thereto, and the movement machine 18 may be, for example, of a vertical articulated type that is similar to the movement machine 16 and is provided side by side with the movement machine 16. In this case, the movement machines 16 and 18 may constitute a so-called double-arm type robot, and move one end effector 14 in cooperation with each other.

In addition, the movement machine 16 is not limited to a vertical articulated robot, and may be, for example, a horizontal articulated robot, a parallel link robot, or a work table device having a plurality of ball screw mechanisms. Also, the machining system 10, 70, or 80 may include three or more movement machines.

Although the present disclosure has been described above through the embodiments, the above embodiments are not intended to limit the invention as set forth in the claims.

REFERENCE SIGNS LIST

10, 70, 80 Machine system
12, 12A, 12B Work machine
14 End effector
16, 18 Movement machine
20 Control device
50 Processor
58 Movement machine operation section
60 Operation state data acquisition section
62 Adaptive control execution section
64 Input switching section

The invention claimed is:

1. A control device configured to move an end effector, which is configured to output a physical element acting on a workpiece, by a plurality of movement machines and perform predetermined work on a workpiece with the element output from the end effector, the control device comprising a processor configured to:

move the end effector by operating a first movement machine while stopping a second movement machine;

execute a first adaptive control to increase or decrease an output value, by which the end effector outputs the element to the workpiece for the predetermined work, during continuous output of the element from the end effector, in response to a first operation state data indicating an operation state of the first movement machine, during moving the end effector by the first movement machine;

move the end effector by operating the second movement machine while stopping the first movement machine, in response to a predetermined command; and execute a second adaptive control to increase or decrease the output value during continuous output of the element from the end effector, in response to a second operation state data indicating an operation state of the second movement machine, during moving the end effector by the second movement machine.

2. The control device of claim 1, wherein the processor receives the predetermined command from a work program configured to execute the predetermined work or a teaching device configured to teach an operation to the first movement machine and the second movement machine.

3. The control device of claim 1, wherein the first operation state data includes at least one of a position, a speed, an acceleration, a distance to a teaching point, or a movement time of the first movement machine, wherein the second operation state data includes at least one of a position, a speed, an acceleration, a distance to a teaching point, or a movement time of the second movement machine.

4. The control device of claim 1, wherein the processor acquires:

the first operation state data based on an operation command for the processor to operate the first movement machine, or feedback supplied from the movement machine to the control device when the processor operates the first movement machine; or the second operation state data based on an operation command for the processor to operate the second movement machine, or feedback supplied from the second movement machine to the control device when the processor operates the second movement machine.

5. A machine system comprising:

the control device of claim 1; and the first movement machine and the second movement machine configured to move an end effector.

6. The machine system of claim 5, wherein the second movement machine is provided at and moved by the first movement machine, the end effector being attached to the second movement machine.

7. A method of moving an end effector, which is configured to output a physical element acting on a workpiece, by a plurality of movement machines and performing predetermined work on a workpiece with the element output from the end effector, the method comprising:

moving, by a processor, the end effector by operating a first movement machine while stopping a second movement machine;

executing, by the processor, a first adaptive control to increase or decrease an output value, by which the end effector outputs the element to the workpiece for the predetermined work, during continuous output of the element from the end effector, in response to a first operation state data indicating an operation state of the first movement machine during the moving the end effector by the first movement machine;

move the end effector by operating a second movement machine while stopping a first movement machine, in response to a predetermined command; and execute a second adaptive control to increase or decrease the output value during continuous output of the element from the end effector, in response to a second operation state data indicating an operation state of the second movement machine, during moving the end effector by the second movement machine.

8. A non-transitory computer-readable recording medium configured to record a computer program configured to cause a processor to execute the method of claim 7.

* * * * *